(12) United States Patent
Liu et al.

(10) Patent No.: US 8,589,266 B2
(45) Date of Patent: Nov. 19, 2013

(54) REQUEST MONEY SOCIAL NETWORKING APPLICATIONS

(75) Inventors: Deborah Yee-Ky Liu, Santa Clara, CA (US); Su-I Lu, Mountain View, CA (US)

(73) Assignee: eBay Inc., San Jose, CA (US)

( * ) Notice: Subject to any disclaimer, the term of this patent is extended or adjusted under 35 U.S.C. 154(b) by 813 days.

(21) Appl. No.: 11/935,139

(22) Filed: Nov. 5, 2007

(65) Prior Publication Data

US 2009/0119212 A1    May 7, 2009

(51) Int. Cl.
*G06Q 40/00* (2012.01)
(52) U.S. Cl.
USPC .............................................. 705/35; 705/38
(58) Field of Classification Search
USPC .............................................. 705/26, 35, 38
See application file for complete search history.

(56) References Cited

U.S. PATENT DOCUMENTS

| | | | |
|---|---|---|---|
| 7,269,590 B2 * | 9/2007 | Hull et al. ..................... | 707/770 |
| 7,376,587 B1 * | 5/2008 | Neofytides et al. ........ | 705/26.35 |
| 2003/0154164 A1 * | 8/2003 | Mascavage et al. ............ | 705/39 |
| 2005/0198031 A1 * | 9/2005 | Pezaris et al. ..................... | 707/9 |

OTHER PUBLICATIONS

Mukherjee, Amit; "Money News"; Sep. 10, 2006; Business Today.*
Zuckerman, Ezra W; "Comment on Zajac and Westphal, ASR, Jun. 2004: Towards the Social Reconstruction of an Indterdiscinplianry Turf War/Reply to Zukcerman: Should Sociological . . . "; Jun. 2004; American Sociological Review.*

* cited by examiner

*Primary Examiner* — Alexander Kalinowski
*Assistant Examiner* — Edward Chang
(74) *Attorney, Agent, or Firm* — Schwegman Lundberg & Woessner, P.A.

(57) ABSTRACT

In some example embodiments, a system and method is illustrated as including receiving a funds request that contains an identifier to uniquely identify a first member of a social networking community, the funds request including an amount of funds requested. Further, this method may include receiving a funds authorization from a grantor of funds. Additionally, this method may include transmitting a funds transfer instruction based upon the funds authorization. Moreover, this method may include transferring the amount of funds requested from an account held by the grantor of funds to an account held by the first member of a social networking community.

24 Claims, 16 Drawing Sheets

FIG. 3

```
SOCIAL NETWORKING SITE | PROFILE  FRIENDS  NETWORKS  INBOX  HOME  ACCOUNT  PRIVACY  LOGOUT
```

300

§§ SEND A REQUEST

YOUR SOCIAL NETWORKING ACCOUNT  [JSMITH@SOCIALNETWORKING.COM]

REQUEST MONEY DETAILS

ONE FRIEND  301 [START TYPING A FRIEND'S NAME]

OR, SELECT MANY (LIMIT 10)
302 ☐ SU LU
    ☐ PYPL SMITH
303 ☐ DEB TESTING
    ☐ MEHRYAR
    ☐ MONSOON

AMOUNT [$ v] [____] 304

NEED MAILING ADDRESS? [NO v]
305

REQUEST MONEY FOR (OPTIONAL)

MESSAGE (OPTIONAL)
306

[CONTINUE]

SEARCH ▶ [____]

APPLICATIONS          EDIT
♀♀ PHOTOS
ßß GROUPS
🎟 EVENTS
§§ PAYMENT PROCESSOR

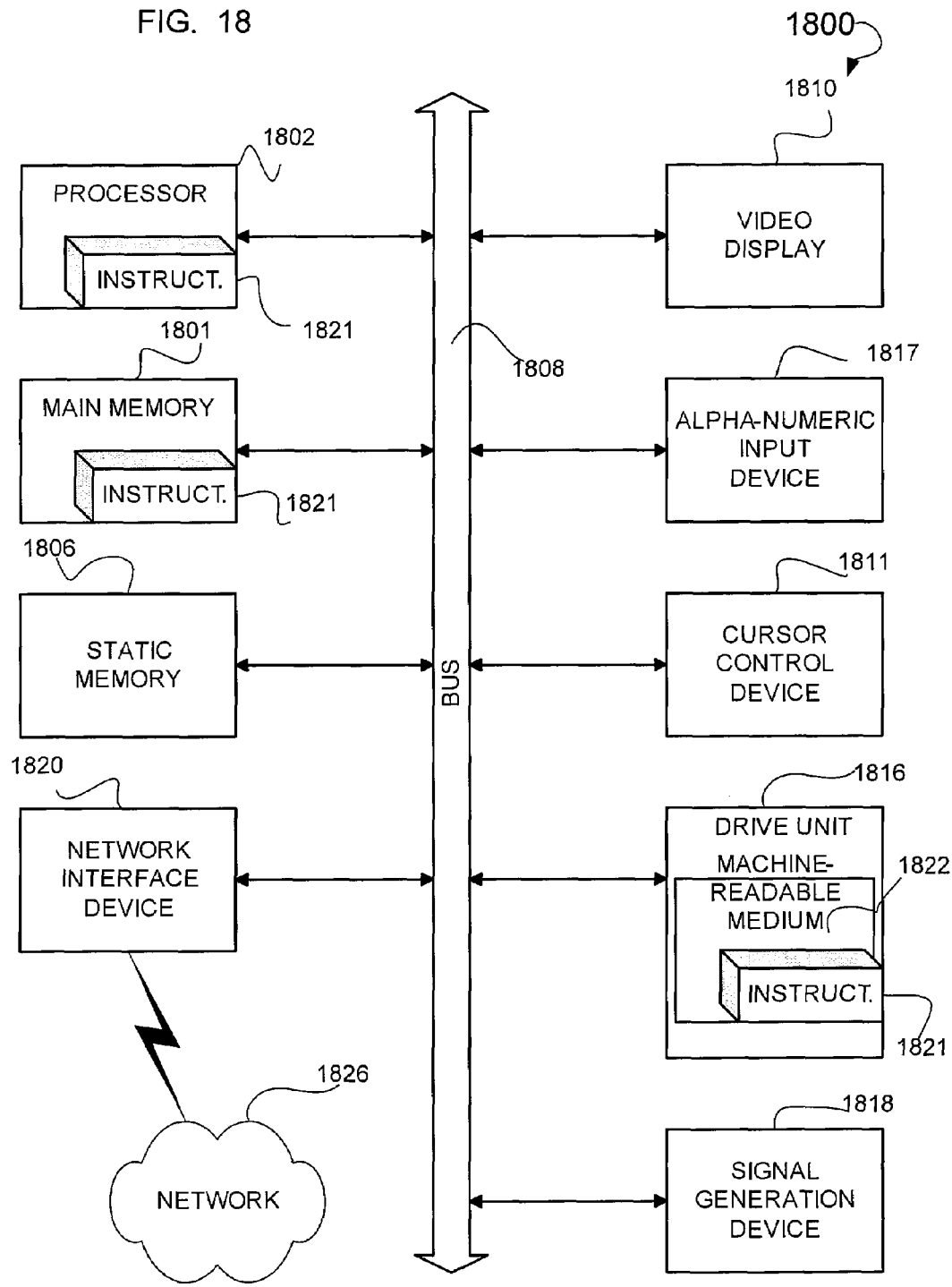

REQUEST MONEY SOCIAL NETWORKING APPLICATIONS

TECHNICAL FIELD

The present application relates generally to the technical field of e-commerce algorithms and, in one specific example, the use of an e-commerce algorithm to transfer funds.

BACKGROUND

Social networking sites allow persons to communicate in relative anonymity by using certain network handles. These network handles may be a name associated with a user, and in some cases, this name may appear as associated with a widget appearing on the home page of a user of the social networking site. By using these networking handles and associated widgets, users of the social networking site may be able to exchange messages and other types of information.

BRIEF DESCRIPTION OF THE DRAWINGS

Some example embodiments are illustrated by way of example and not limitation in the figures of the accompanying drawings in which:

FIG. 3 is a diagram of a payment request page, according to an example embodiment.

FIG. 18 shows a diagrammatic representation of a machine in the form of a computer system, according to an example embodiment.

DETAILED DESCRIPTION

Figure 1:
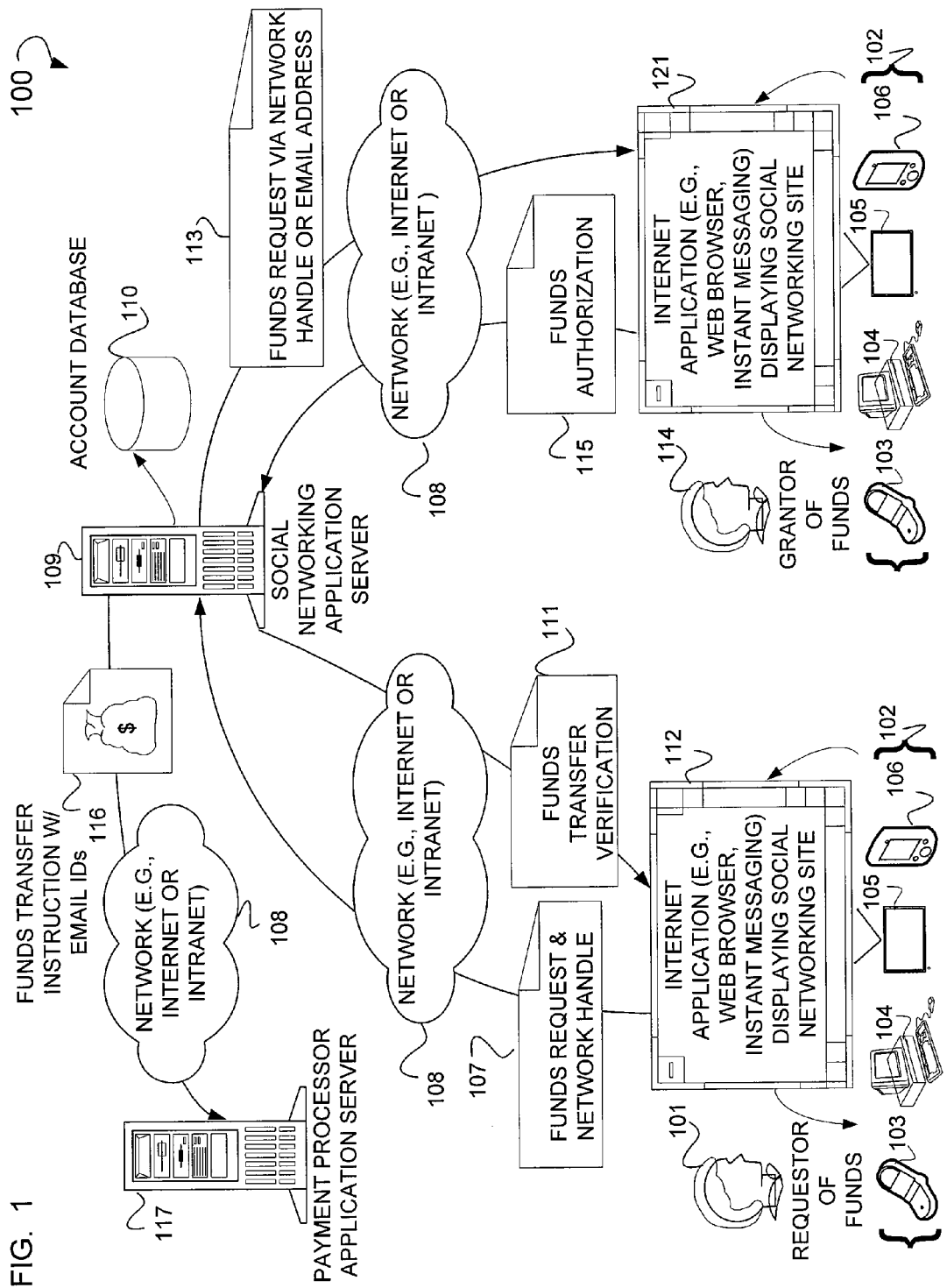
FIG. 1 is a diagram of a system illustrating the generation of a funds request and the subsequent transfer of funds based upon this request, according to an example embodiment.

Example methods and systems to request a transfer of funds from a user of a social networking site are disclosed herein. In the following description, for purposes of explanation, numerous specific details are set forth in order to provide a thorough understanding of example embodiments. It will be evident, however, to one skilled in the art that the present invention may be practiced without these specific details.

In some example embodiments, a system and method is shown that allows users of a social networking site to request funds from other users of the social networking site. Social networking sites are web sites that allow communities of people who share interests and activities, or who are interested in exploring the interests and activities of others, to communicate. Some well known social networking sites or communities include FACEBOOK™ of Facebook Corporation of Palo Alto, Calif., and MYSPACE™ of MySpace Corporation of Beverly Hills, Calif. An aspect of these social networking sites is providing to a user (e.g., a member of a social networking site) a customizable social networking site home page that the user can customize based upon their own needs and desires. In some example cases, a Hyper Text Markup Language (HTML) editor is provided to the user to allow them to edit the text that may appear on their social networking site home page. In some example embodiments, a user of a social networking application may be an account holder such as a requestor of funds or grantor of funds. Further, in some example cases, a social networking application provides various open Application Programming Interfaces (API) that allow users to write applications that can interface with the social networking application to provide additional functionality for their social networking site home page. This additional functionality may be in the form of additional services provided to the users of the social networking site home page. In some example cases, these applications are known as widgets.

Some example embodiments may include a user of a social networking site as being a person (e.g., a legal person such as a corporation, or a natural person) who has at least one account with the social networking site. Account is a mechanism that allows the user to utilize the resources of the social networking site. Resources may include the ability to request and authorize the transfer of funds.

Some example embodiments may include the use of a widget to provide various services to a user of a social networking site home page. For example, in one embodiment, a widget in the form of a request money application is used to generate a request for funds and transmit this request for funds to a social networking application, which in turn forwards the request to a second user of the social networking application. If approved by this second user, the social networking application may interface with a payment processor application to transfer the requested funds from an account held by the second user to an account held by the user requesting the funds. In other example embodiments, it is the request money application itself that interfaces with the payment processor application to facilitate the transfer of funds. Some well known payment processor applications are those designed and implemented by PAYPAL™. In some example embodiments, this request money application may be provided by the payment processor as a service that can be downloaded to and implemented on the social networking site home page. In some example embodiments, this request money application (e.g., a funds request application) may be written using Dynamic HTML (DHTML), or Asynchronous JavaScript and XML (AJAX) technology. Further, in some example embodiments, FLASH™ technology may be used.

EXAMPLE SYSTEM

FIG. 1 is a diagram of an example system 100 illustrating the generation of a funds request and the subsequent transfer of funds based upon this request. A funds request may, in some example embodiments, be part of a funds request and network handle message 107, and may include information identifying a monetary amount of a funds request. In some example embodiments, a network handle may be an alphanumeric string value used to uniquely identify a request or funds or grantor of funds without divulging private information regarding these persons. Shown is a requester of funds 101 who utilizes an Internet application 112. In some example embodiments, this requestor of funds 101 may be a member of a social networking community. This Internet application 112 may include, for example, a web browser, an instant messaging application, or some other suitable Internet application. This Internet application may display, for example, on some type of social networking site and content associated therewith.

In some example embodiments, this Internet application 112 may be executed and run on, for example, a cell phone 103, a computer system 104, a television 105, a Personal Digital Assistant (PDA) 106, or some other suitable device. Collectively these various devices 103-106 may be referenced herein as devices 102. Some example embodiments may include the requestor of funds 101 generating the funds request and network handle message 107 (e.g., a funds request) that may be transmitted across a network 108 to, for example, a social networking application server 109. In some example embodiments, a plurality of social networking application servers 109 may be implemented such that this plurality of social networking application servers 109 may belong to the same social networking site and serve the same social networking community. This social networking application server 109 may be operatively coupled to an account database 110. In some example embodiments, this social networking application server 109 may also be operatively coupled to a web server or plurality of web servers, and a database server or a plurality of database servers.

In some example embodiments, a funds request application may be utilized to generate the funds request and networking handle message 107. This funds request application may be written using certain programming principles and technology associated with DHTML, AJAX, or some other suitable programming principles and technology. In one example embodiment, a requestor of funds 101 selects a widget as it may appear in the internet application 112. Once selected, the network handle (e.g., an identifier to uniquely identify the requestor of funds 101) associated with the widget and an amount of funds being requested is encoded into an eXtensible Markup Language (XML) format, and wrapped in an additional layer of encoding such as the Transmission Control Protocol/Internet Protocols (TCP/IP). After the wrapping in the additional layer of encoding occurs, the network handle and amount of funds is sent as a funds request and networking handle message 107.

Once this funds request and networking handle message 107 is received by the social networking application server 109, a funds request 113 is sent across the network 108 to, for example, a grantor of funds 114. In some example embodiments, the grantor of funds may be a member of a social networking community. The grantor of funds 114 may be identified by their network handle or an email address. In still other example embodiments, a grantor of funds is automatically identified by their email address at the time a payment is made in response to the funds request 113 irrespective of whether the grantor or funds has an account with a payment processor application server 117. Further, this grantor of funds 114 may utilize an Internet application 121 that may include a web browser, an instant messaging application, or some other suitable application that may be used to display a social networking site. As with the Internet application 112, the Internet application 121 may be executed on, for example, a cell phone 103, a computer system 104, a television 105, a PDA 106, or some other suitable device. In some example embodiments, the grantor of funds 114 may generate and send a funds authorization data packet 115 utilizing the Internet application 121. This funds authorization data packet 115 may be sent across the network 108 to the social networking application server 109. Once this funds authorization data packet 115 is received by the social networking application server 109, a funds transfer instruction with email IDs 116 may be sent across the network 108 to, for example, the payment processor application server 117. In some example embodiments, the internet applications 112 and 121 may provide a Graphical User Interface (GUI) to allow the requestor of funds 101 to generate a funds request and network handle 107, and to allow the grantor of funds 114 to generate a funds authorization data packet 115. A selection device such as a mouse, light pen, keyboard, or other suitable selection device may be used in conjunction with the GUI.

In some example cases, the funds authorization data packet 115 (e.g., funds authorization) may be hashed, symmetrically encrypted, asymmetrically encrypted, or some combination or permutation of these processes performed so as to both prove the identity of the grantor of funds 114, and to obscure the amount funds being authorized. That is, the funds authorization data packet 115 may contain an identifier to uniquely identify the grantor of funds and an amount. With regard to proving the identity of the grantor of funds 114, the grantor of funds 114 may provide a private key, or may uniquely hash an identity value (e.g., their own network handle) so as provide a digital signature to be used to prove their identity. As to obscuring the amount of funds being authorized, a hash algorithm, and/or symmetric or asymmetric algorithm may be implemented to obscure the amount of funds. Some well known hashing algorithms include Message-Digest 5 (MD-5), Secure Hash Algorithm (SHA-1), while some well known symmetric algorithms include Twofish, Serpent, Advanced Encryption Standard (AES), Blowfish, Carlisle Adams and Stafford Tavares 5 (CAST5), (Rivest Cipher 4) RC4, Triple Data Encryption Standard (TDES), and International Data Encryption Algorithm (IDEA). Some well know asymmetric algorithms include Rivest, Shamir, Adleman (RSA), Diffie-Hellman, and Digital Signature Standard (DSS).

In some example embodiments, the funds request and network handle 107, funds transfer verification 111, funds authorization 115, funds request 113, and funds transfer instruction with email IDs 116 may be formatted. This formatting may include, for example, the use of the Hyper Text Transfer Protocol Secure (HTTPS), Secure Sockets Layer (SSL), Secure Shell (SSH), and other suitable protocols to obscure the selection input. The HTTPS, SSL, SSH, and other suitable protocols may be used in conjunction with TCP/IP such that a session may be established between, for example, the one or more devices 102 and the social networking application server(s) 109.

Some example embodiments may include the requestor of funds 101 and the grantor of funds 114 being members of the same, or different social networking community. For example, in some example embodiments, the grantor of funds may be able to authorize funds to be sent from a first social networking community to a second social networking community. More to the point, in some example embodiments, the social networking application servers 109 used by one social networking site may be used to send the funds authorization 115 to another social networking application server 109 operated by a different social networking site.

EXAMPLE INTERFACES

Figure 2:
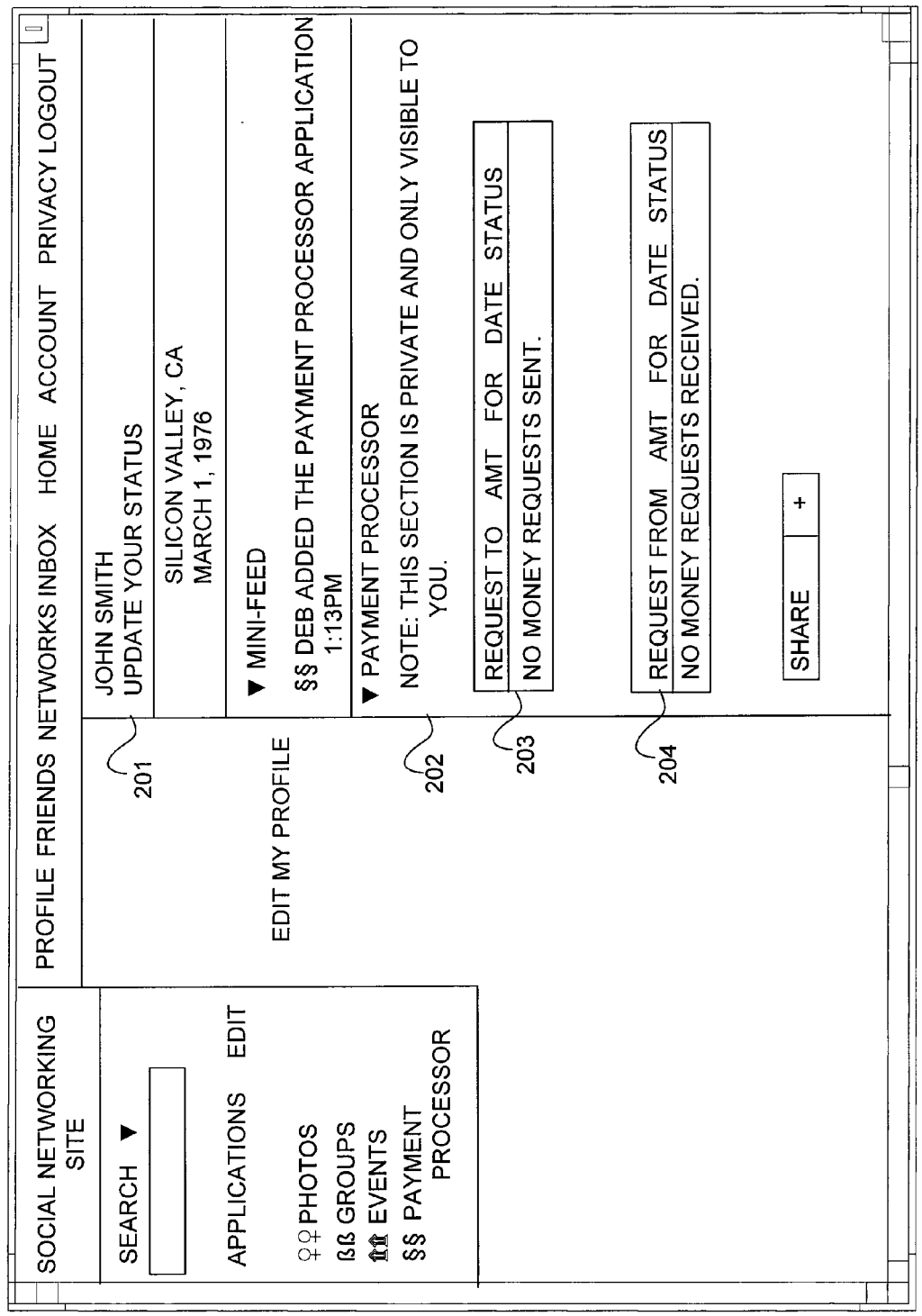
FIG. 2 is a diagram of a social networking site homepage, according to an example embodiment.

FIG. 2 is a diagram of an example social networking site homepage 200 that may be displayed by, for example, the Internet application 112 or the Internet application 121. This social networking site homepage 200 may be the homepage for an individual user of the social networking site. Shown is a frame 201 identifying the particular individual whose homepage this is, which in this case is John Smith. This individual may, in some example cases, function in the role of the requestor of funds 101, or as the grantor of funds 114. Also shown is a frame 202 that displays payment processor information. For example, contained within this frame 202 is a further subframe 203 that displays to whom the funds request and network handle message 107 has been sent by the requester of funds 101. A further subframe 204 is displayed within the frame 202 that illustrates from whom funds have been received (e.g., who the grantor of funds 114 may be).

FIG. 3 is a diagram of an example payment request page 300 that may be displayed by the Internet application 112 or Internet application 121. Shown is a textbox 301 that may be used to input text relating to a particular friend or grantor of funds. The textbox 301 may serve as an interface for a search application that may perform a lexigraphic search in the account database 110 for the text entered into the textbox 301. Further, this friend or grantor of funds may be the party of whom a funds request is made. The friend or grantor of funds' name may be their network handle, their proper name, their email address, or some other suitable way to identify this potential grantor of funds from who a funds request is made. A checkbox 302 and checkbox 303 denote network handles (e.g., the network name of the friend or grantor of funds) from whom a funds request can be made. Here for example, a network handle "Pypl Smith" corresponds to the checkbox 302 and a network handle "Mehryar Monsoon" corresponds to checkbox 303. A textbox 304 provides a textbox into which information can be entered as to the amount of the funds request. Further, a textbox 305 provides a textbox into which a purpose for the funds request can be entered. A textbox 306 provides a textbox into which text regarding a message for the friend or grantor of funds may be provided.

Figure 4:
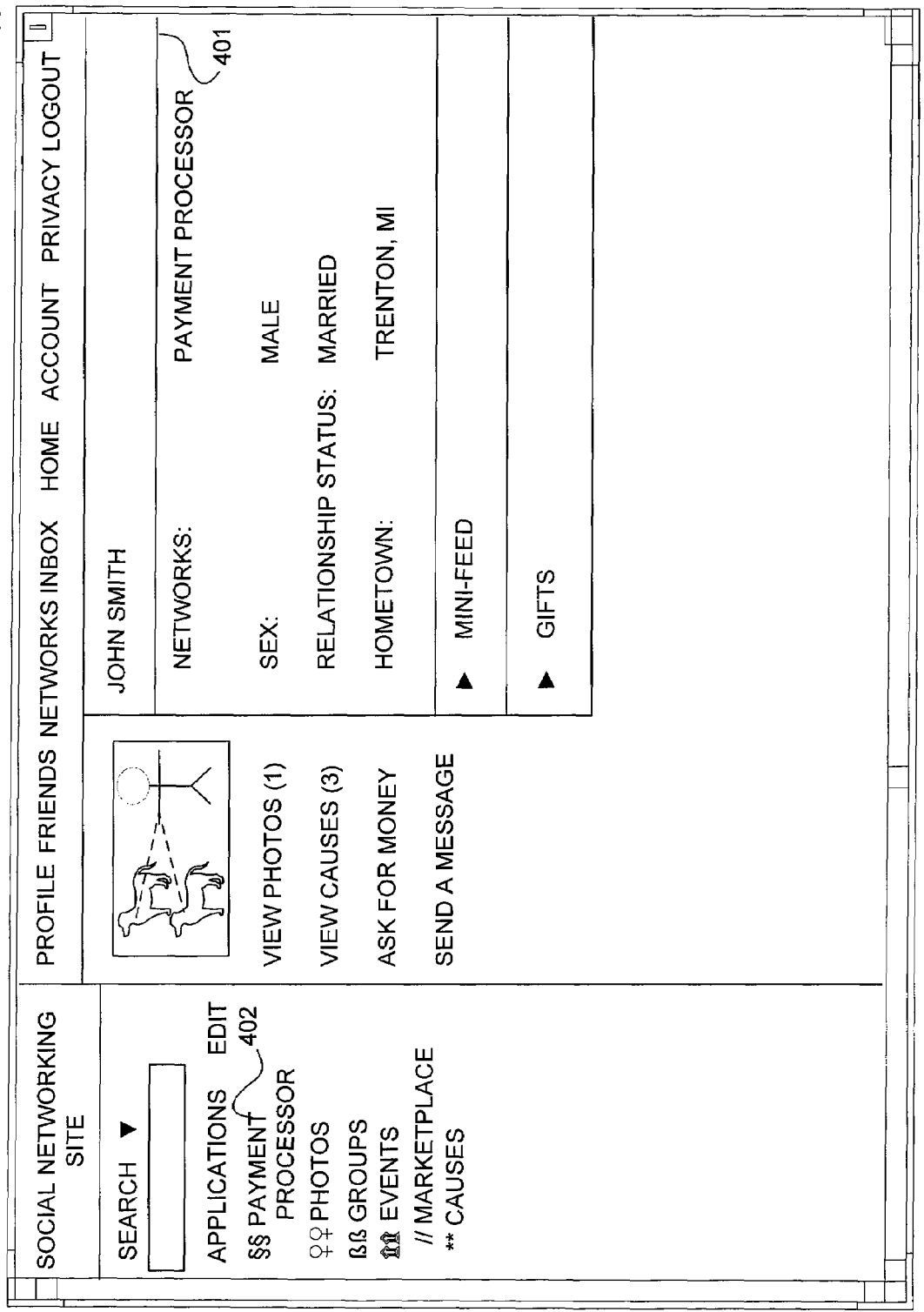
FIG. 4 is a diagram of a social networking site homepage for a grantor of funds, according to an example embodiment.

FIG. 4 is a diagram of an example social networking site homepage 400 for a particular individual. Shown is a name field 401 containing the name of the particular person to whom the homepage 400 belongs. Also shown is a link 402 whereby a requestor of funds 101 can click (e.g., execute a select operation using an input device such as a mouse) on this link and can access a particular payment processor application such that the requestor of funds 101 may be able to make a funds request directly from the homepage 400. This is in contrast to making a funds request from, for example, the homepage of the requester of funds as shown in, for example, FIGS. 2 and 3.

Figure 5:
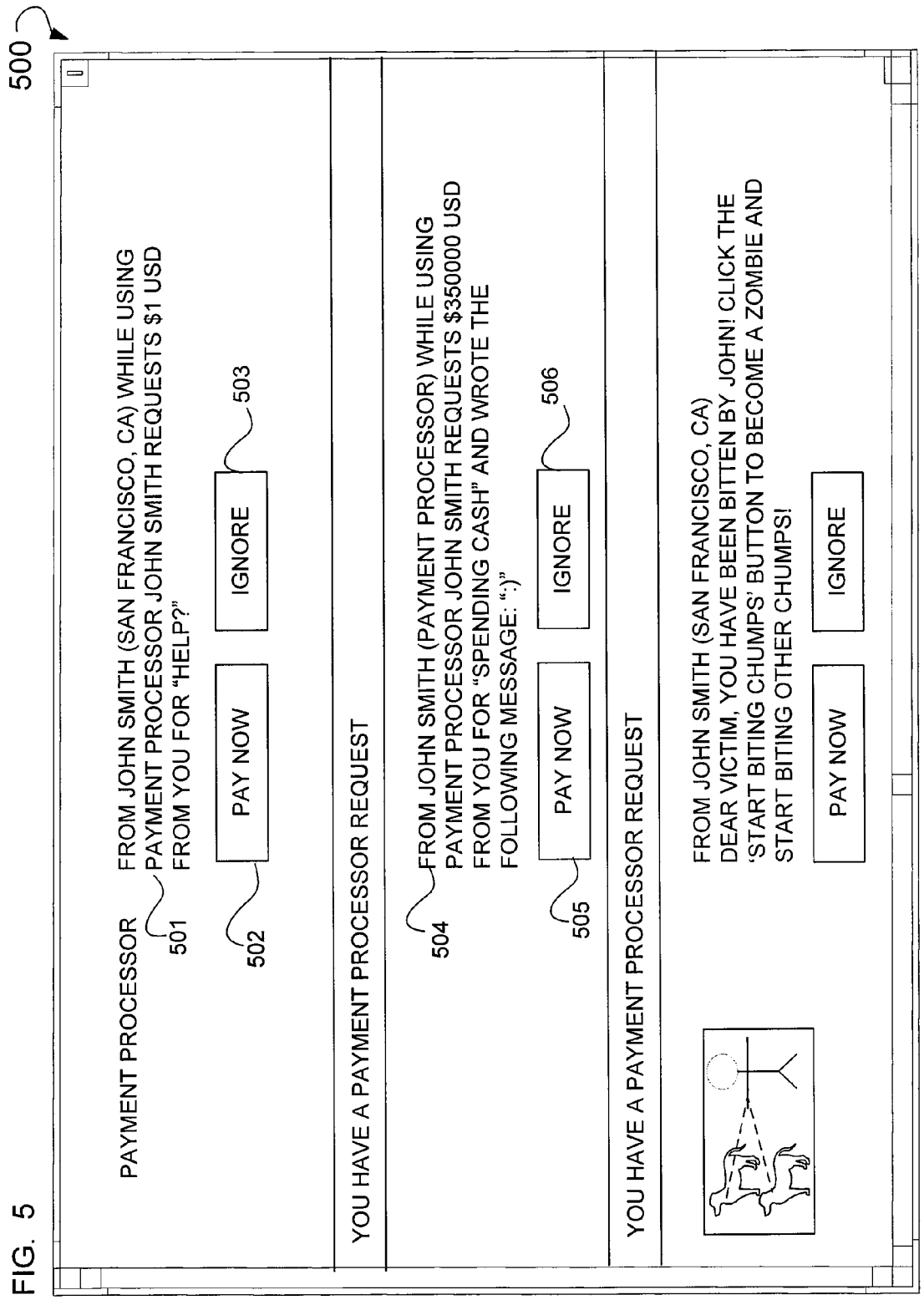
FIG. 5 is a diagram of a message page, according to an example embodiment.

FIG. 5 is a diagram of an example message page 500 that may be displayed by, for example, the Internet application 112 or 121. Here, for example, a message is provided from a payment processor requesting funds. For example, a message field 501 contains a message relating to a request for funds. Additionally, a button 502 is provided that may be executed to actually grant the funds, whereas a button 503 is also provided that may be executed such that a potential grantor of funds 114 may ignore the request for funds. Also shown is a second request for funds wherein a message 504 provides a second message relating to a request for funds. Further buttons 505 and 506 are provided wherein 505 allows one to grant a particular payment of funds, and button 506 allows one to ignore a particular funds request.

Figure 6:
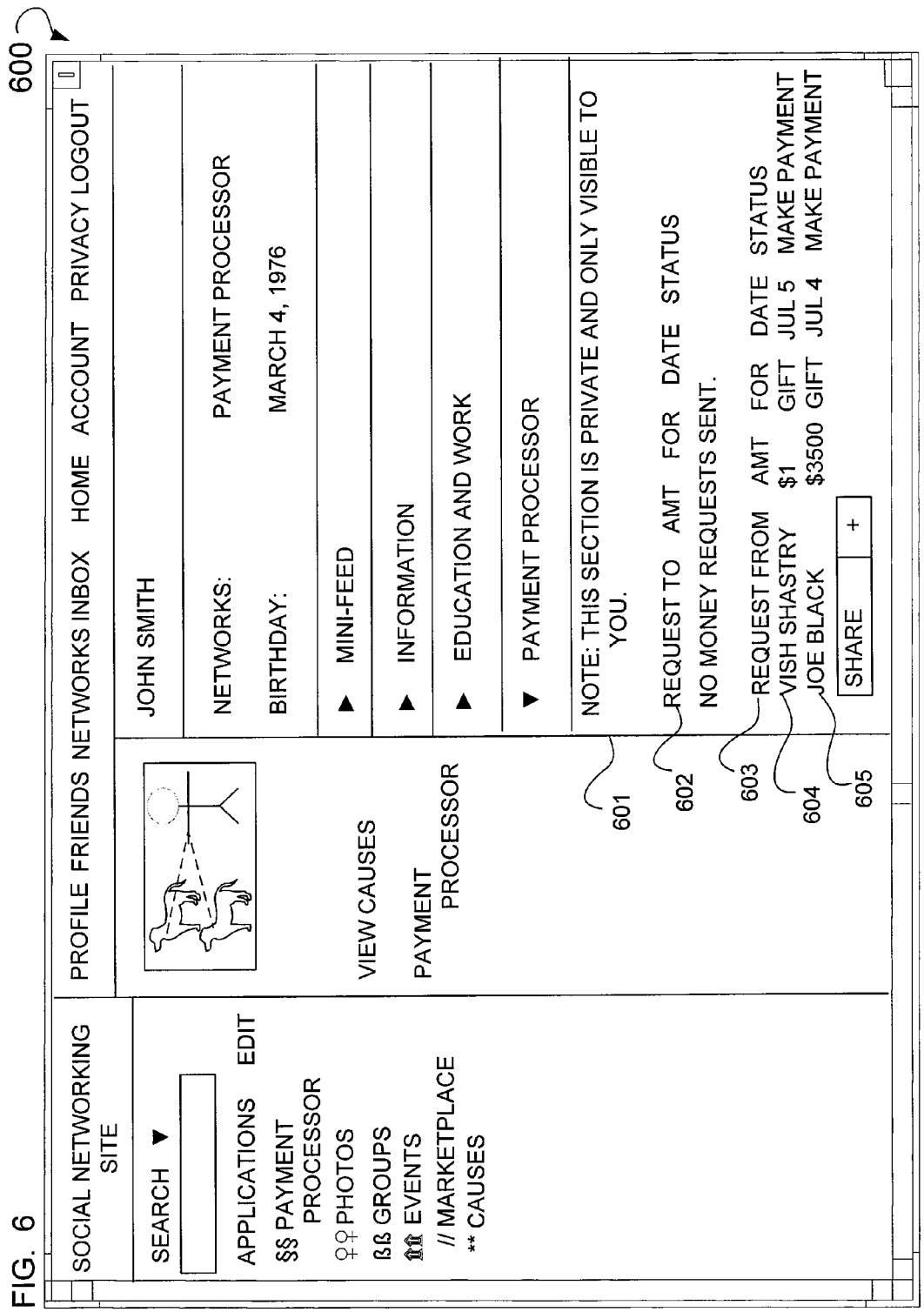
FIG. 6 is a diagram of a homepage for the requestor of funds, according to an example embodiment.

FIG. 6 is a diagram of an example homepage 600 for the requestor of funds 101. Shown is a frame 601 that may be displayed as a result of the execution of an Internet application 112. Contained within this frame 601 are a number of subframes containing text. For example, a subframe 602 contains text relating to particular parties from whom money has been requested. A subframe 603 contains information regarding funds that have been provided as a result of a request. Here, for example, a subframe 604 states that "Vish Shastry" has provided a gift of funds in the form of $1 that was made on July 5th. Further, a subframe 605 shows that a "Joe Black" has made a gift of $3,500 on July 4th in response to a funds request.

EXAMPLE LOGIC

Figure 7:
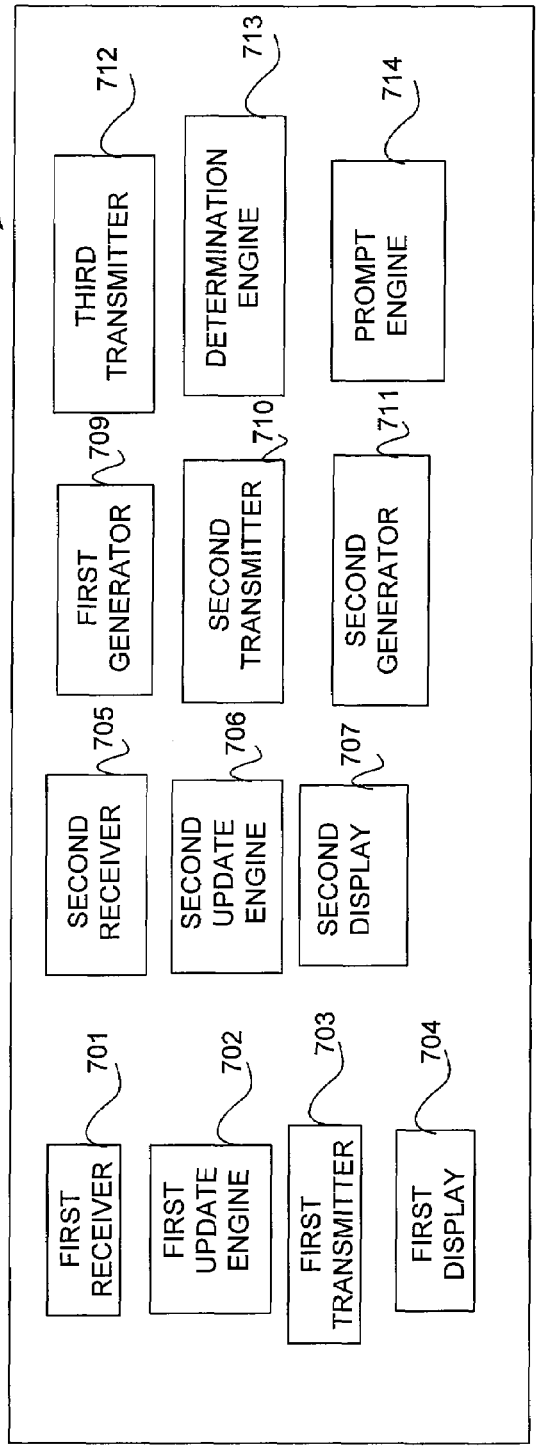
FIG. 7 is a block diagram of a computer system in the form of a device, according to an example embodiment.

FIG. 7 is a block diagram of an example computer system in the form of, for example, a device 102. These various blocks may be implemented in hardware, firmware, or software. Illustrated is a computer system including a first receiver 701 to receive input to select a network handle generated by a selection device. Also shown is a first update engine 702 to update a data store to track a funds request. A first transmitter 703 is illustrated that transmits the funds request and the network handle. Further, a first display 704 is implemented to display the funds request in a GUI. In some example embodiments, this computer system may include a second receiver 705 to receive a funds payment confirmation. A second update engine 706 may be implemented to update a data store to track a payment made in response to the funds request. Also shown is a second display 707 to display the payment made in the GUI. Some example embodiments may include a second receiver 705 to receive a funds request that identifies a requester of funds. In some example cases, the computer system includes a second receiver 705 to receive input that selects the funds request as displayed in a second GUI, and a first generator 709 to generate a funds authorization that identifies a grantor of funds.

In some example cases, a second transmitter 710 is shown to transmit a funds authorization message. In some example embodiments, a second generator 711 is shown to generate a funds transfer instruction based, in part, upon the funds authorization message. Also, a third transmitter 712 may be implemented to transmit the funds transfer instruction, based upon the funds authorization message, to a payment processor. A determination engine 713 may be implemented to determine whether a requestor of funds has an account with the payment processor based, in part, upon the funds authorization message. Also this determination engine 713 may be implemented to determine whether the grantor of funds has an account with the payment processor, based, in part, upon the funds authorization message. A prompt engine 714 may be implemented to prompt a user to set up an account with the payment processor, based, in part, upon the funds authorization message, the user including at least one of the grantor of funds and the requestor of funds. Moreover, in some example embodiments, a third transmitter 712 may be implemented to transmit a funds transfer instruction based upon the funds authorization message, using at least one of a social networking application and a widget application.

Figure 8:
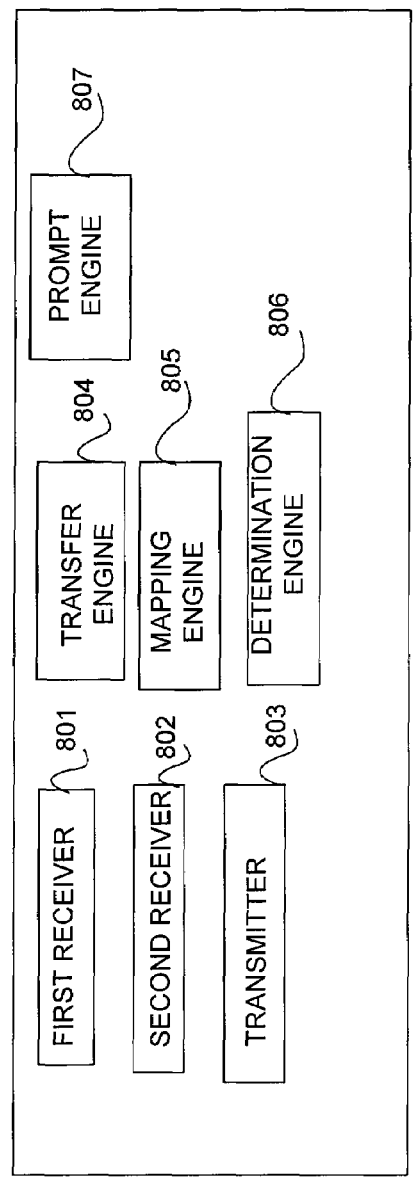
FIG. 8 is a block diagram of a computer system in the form of a social networking application server, according to an example embodiment.

FIG. 8 is a block diagram of an example computer system in the form of, for example, a social networking application server 109. These various blocks may be implemented in hardware, firmware, or software. Illustrated is a computer system including a first receiver 801 to receive a funds request that contains an identifier to uniquely identify a requestor of funds, the funds request including an amount of funds requested. Further, a second receiver 802 is shown that receives a funds authorization from a grantor of funds. A transmitter 803 may be used to transmit a funds transfer instruction based upon the funds authorization. Moreover, a transfer engine 804 may be implemented to transfer the amount of funds requested from an account held by the grantor of funds to an account held by the requestor of funds. In certain example cases, the identifier includes a network handle. In some example embodiments, an account held by a requestor of funds may be some type of account used by a Financial Institution (FI) to hold funds, and may include a checking account, debit card account, credit card account, savings account, or some other suitable account. A mapping engine 805 may be implemented to map the network handle to an email address. In certain example cases, the funds transfer instruction includes an email identifier. Moreover, the computer system may include a transmitter 803 to transmit the funds transfer instruction, based upon the funds authorization, to a payment processor. Also, in some example cases, a determination engine 806 may be implemented to determine whether the requester of funds has an account with the payment processor. Further, this determination engine 806 may determine whether the grantor of funds has an account with the payment processor. In certain cases, a prompt engine 807 may act to prompt a user to set up an account with the payment processor, the user including at least one of the grantor of funds and the requester of funds. The transmitting of the funds transfer instruction may be performed by an application including at least one of social networking application and a widget application.

Figure 9:
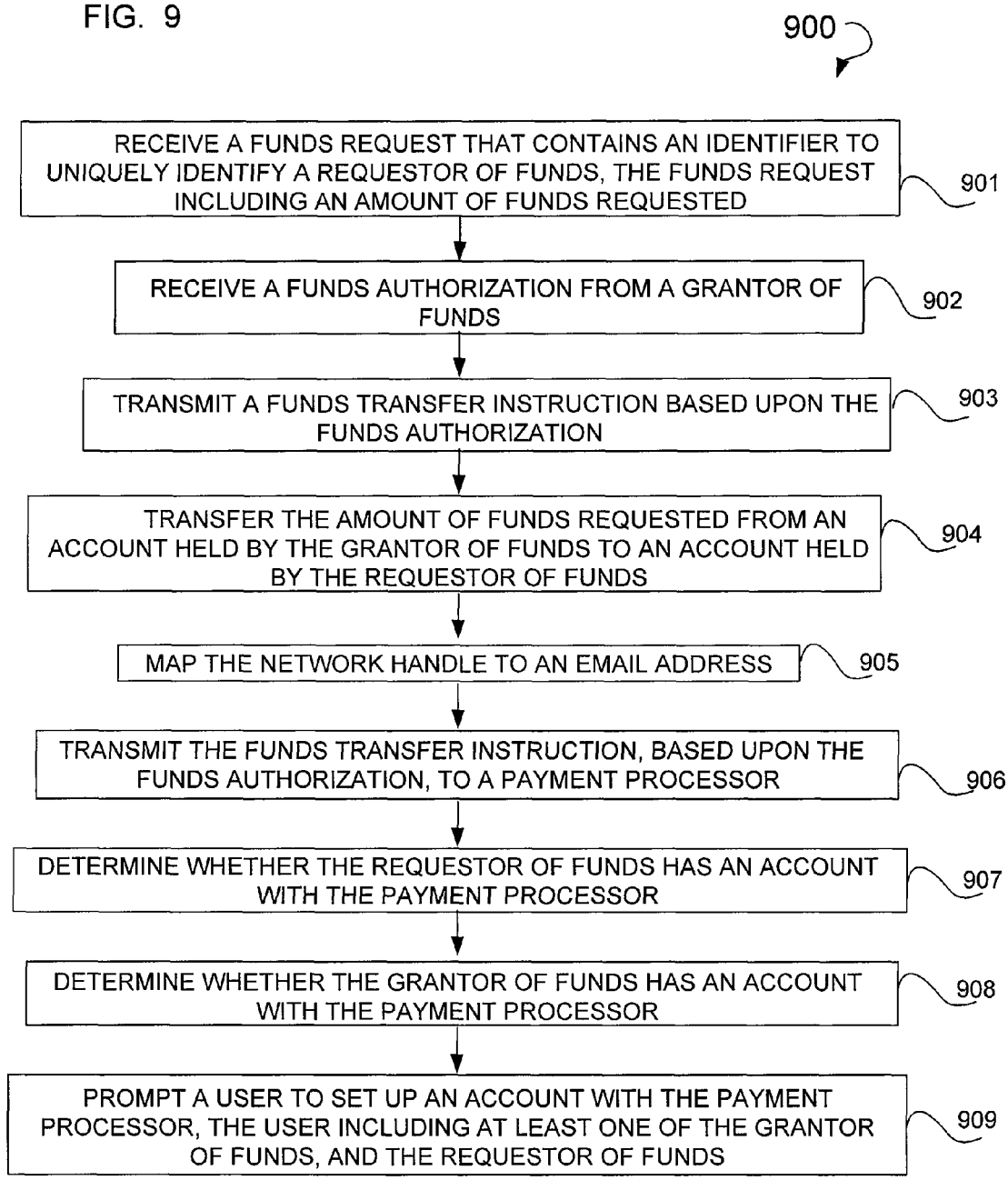
FIG. 9 is a flow chart illustrating a method to receive a funds request, according to an example embodiment.

FIG. 9 is a flow chart illustrating an example method 900 to receive and process a funds request. Shown is an operation 901 that when executed receives a funds request that contains an identifier to uniquely identify a first member of a first social networking site, the funds request including an amount of funds requested. An operation 902 is also shown that, when executed, receives a funds authorization from a second member of a second social networking site. Operation 903, when executed, transmits a funds transfer instruction based upon the funds authorization. Further, when executed, an operation 904 transfers the amount of funds requested from an account held by the second member of the second social networking site to an account held by the first member of the first social networking site. In certain example embodiments the identifier of operation 901 includes a network handle. An operation 905, when executed, maps the network handle to an email address. In certain example embodiments, the funds transfer instruction includes an email identifier. Moreover, an operation 906 may be implemented that transmits the funds transfer instruction, based upon the funds authorization, to a payment processor. Operation 907, when executed, determines whether the first member of the first social networking site has an account with the payment processor. Further, operation 908, when executed, determines whether the second member of the second social networking site has an account with the payment processor. A further operation 909, when executed, may act to prompt a user to set up an account with the payment processor, the user including at least one of the second member of the second social networking site and the first member of the first social networking site. In some example embodiments, the transmitting of the funds transfer instruction is performed by an application including at least one of a social networking application and a widget application. In some example embodiments, the first and second members may be members of the same social networking sites.

Figure 10:
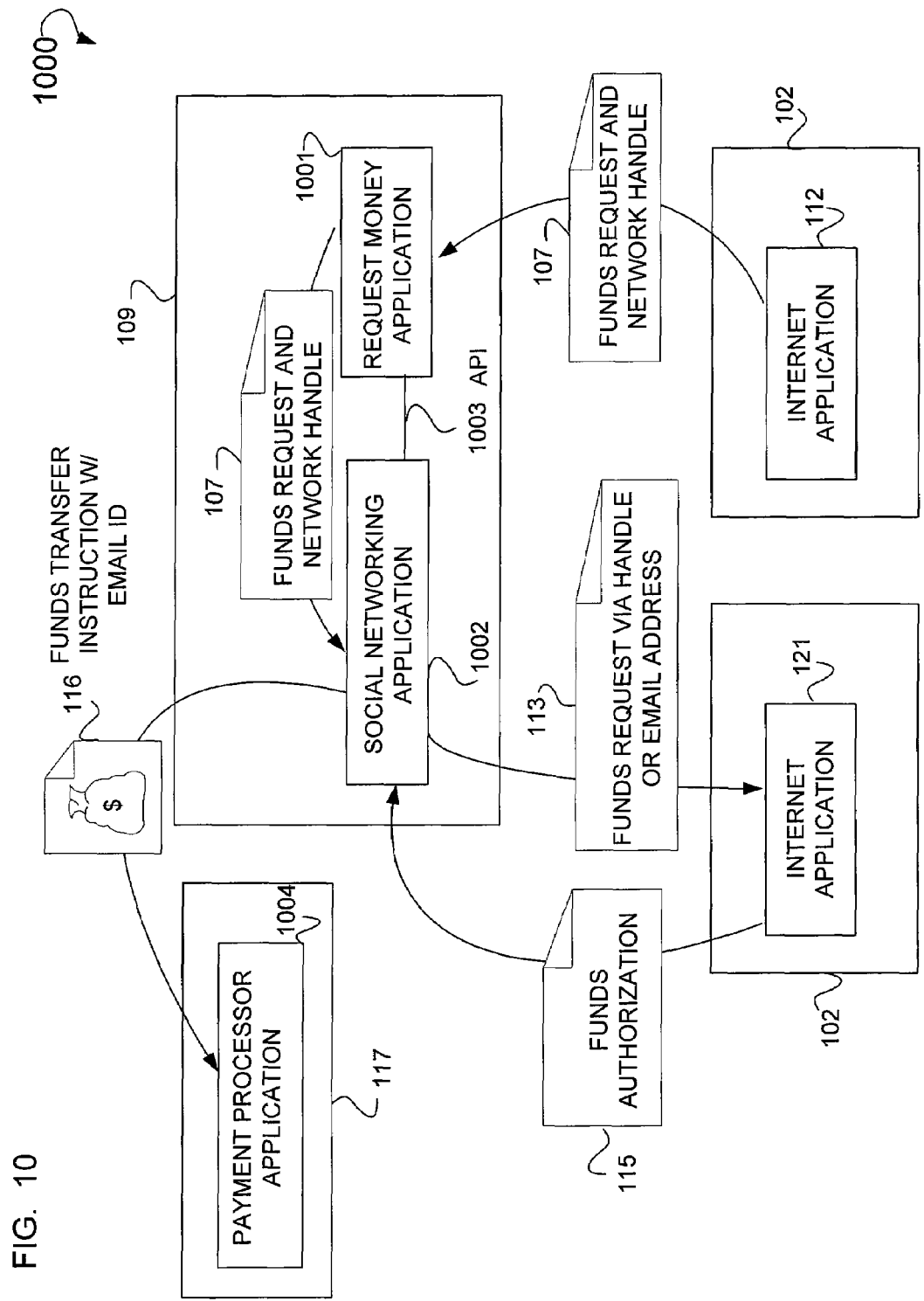
FIG. 10 is a block diagram of a system illustrating the generation of a funds request and the subsequent transfer of funds based upon this request, according to an example embodiment.

FIG. 10 is a block diagram of an example system 1000 illustrating the generation of a funds request and the subsequent transfer of funds based upon this request. Shown is the Internet application 112 that resides on, for example, any one of a number of devices 102. Using the Internet application 112, a funds request 107 and network handle message is made using, for example, a network handle that uniquely identifies the party from whom the funds are being requested (e.g., the grantor of funds 114). In some example embodiments, this funds request and network handle message 107 may be received by a request money application 1001 that may be operatively connected to a social networking application 1002 via an API 1003. Once the request money application 1001 is operatively connected to the social networking application 1002, the finds request and network handle message 107 may be transmitted from the request money application 1001 to the social networking application 1002. Once received by the social networking application 1002, a funds request via a network handle or email address 113 may be sent from the social networking application 1002 to the Internet application 121. This Internet application 121, as previously illustrated, may reside as a part of any of a number of devices 102. The Internet application 121 may, for example, generate a funds authorization data packet 115 that may be sent back to the social networking application 1002. A funds transfer instruction with email IDs 116 may be sent to, for example, a payment processor application 1004 that resides on the payment processor application server 117. Each of these various blocks may be more fully described below. Further, each one of these blocks may be implemented in, for example, software, firmware, or even hardware.

Figure 11:
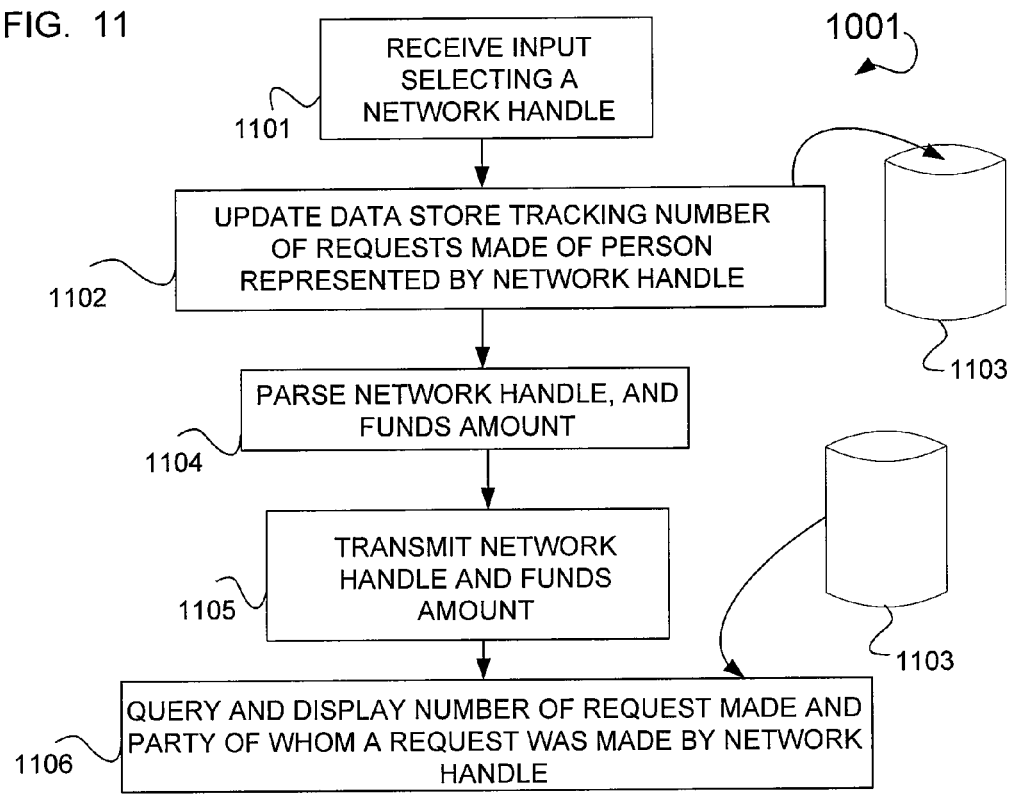
FIG. 11 is a flowchart illustrating a method used to execute the social networking application, according to an example embodiment.

FIG. 11 is a flowchart illustrating an example method used to execute the social networking application 1002. Shown is an operation 1101 that, when executed, receives input selecting a particular network handle. This network handle, as previously illustrated, may relate to a particular person and that person's ID on a particular network such as a social network. As discussed above, this network handle may exist as a widget on the homepage for an individual user of the social networking site. An operation 1102, when executed, updates a data store tracking the number of funds request made of a person represented by their network handle. This update may be provided to a database 1103. An operation 1104 may be executed that parses a network handle and funds amount from the received input. An operation 1105 may transmit a network handle and funds amount to be received through the execution of an operation 1106. This operation 1106 may query and display a number of requests made by a particular requestor of funds, such as the requestor of funds 101. This display of requests may be displayed on, for example, the social networking site homepage 200.

Figure 12:
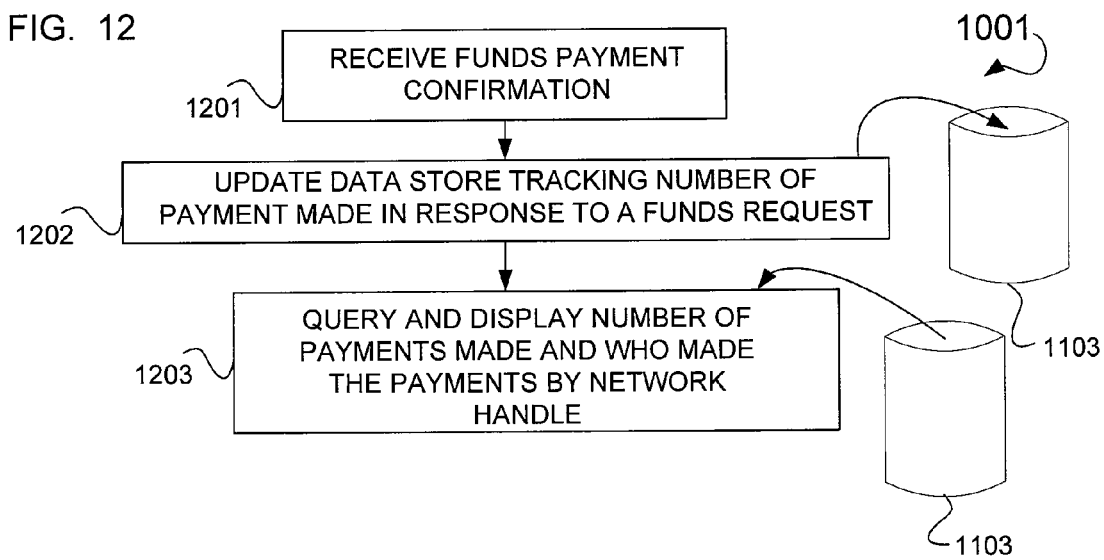
FIG. 12 is a flowchart illustrating a method used to execute the request money application, according to an example embodiment.

FIG. 12 is a flowchart illustrating an example method used to execute the request money application 1001. Shown is an operation 1201 that, when executed, receives a funds payment confirmation. An operation 1202 may be executed that updates the database 1103, tracking the number of payments made in response to a funds request. An operation 1203 may be executed that queries and displays a number of payments made and by whom these payments have been made based upon a particular party's network handle. This query may be made of, for example, the database 1103.

Figure 13:
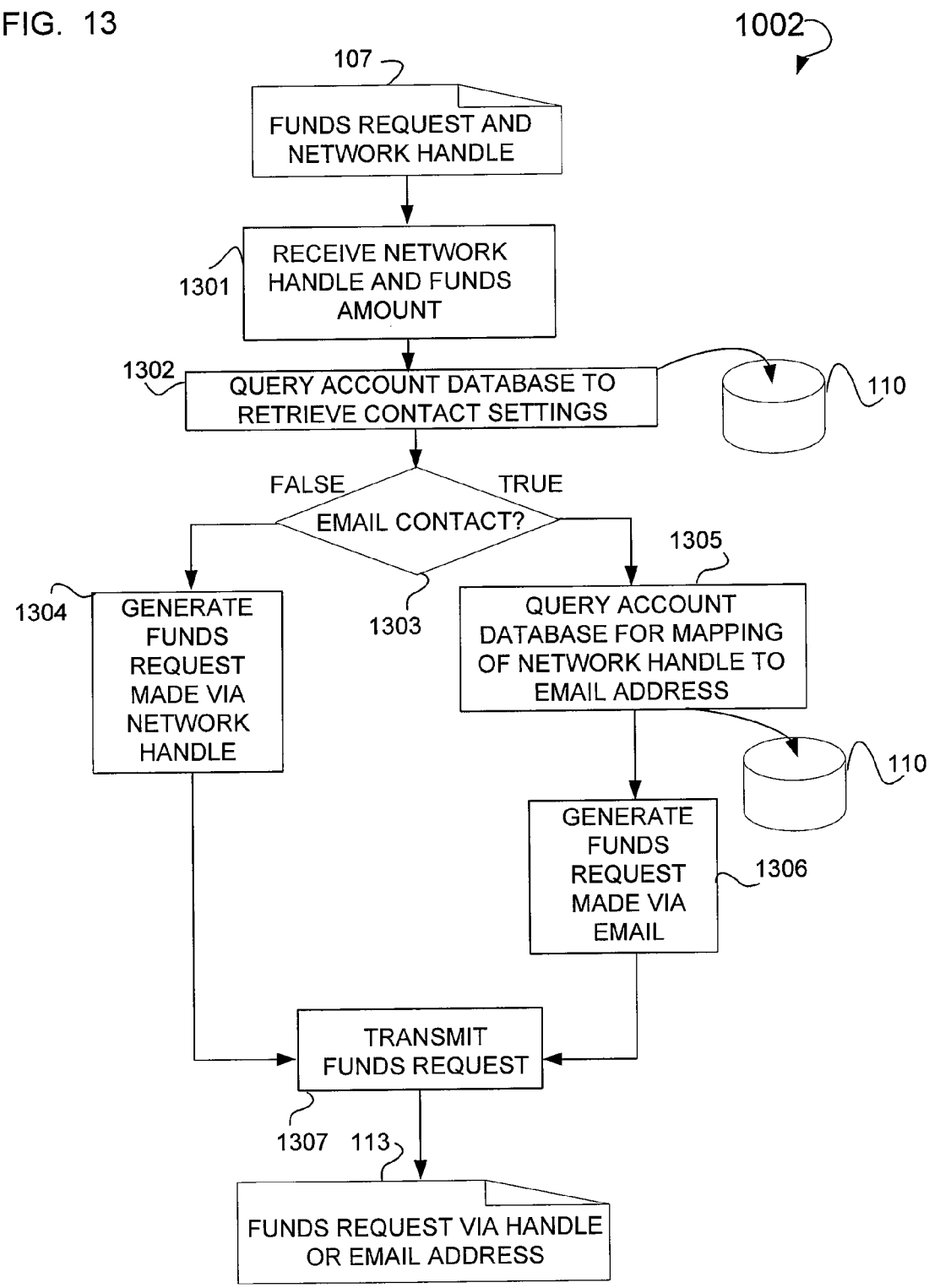
FIG. 13 is a flowchart illustrating a method used to execute the social networking application for the purpose of transmitting a funds request, according to an example embodiment.

FIG. 13 is a flowchart illustrating an example method used to execute the social networking application 1002. Shown is the funds request and network handle message 107 that is received through the execution of an operation 1301. An operation 1302 may be executed that queries an account database 110 to retrieve certain contact settings. A decisional operation 1303 may be executed to determine whether email contact is possible, specifically whether or not the party from whom the funds are being requested may be contacted via email, or whether they should be contacted via their network handle. In cases where a decisional operation 1303 evaluates to "false," an operation 1304 is executed that generates a fund request that is made via the network handle of the party from whom the funds are being requested (e.g., the grantor of funds 114). In cases where a decisional operation 1303 evaluates to "true," a further operation 1305 is executed that queries the account database 110 for a mapping of the network handle to an email address for the grantor of funds 114. An operation 1306 may be executed that generates a funds request via email. This funds request may be provided to an operation 1307 regardless of whether the funds request is made via email or via network handle. When executed, operation 1307 transmits a funds request via a network handle or email address 113.

Figure 14:
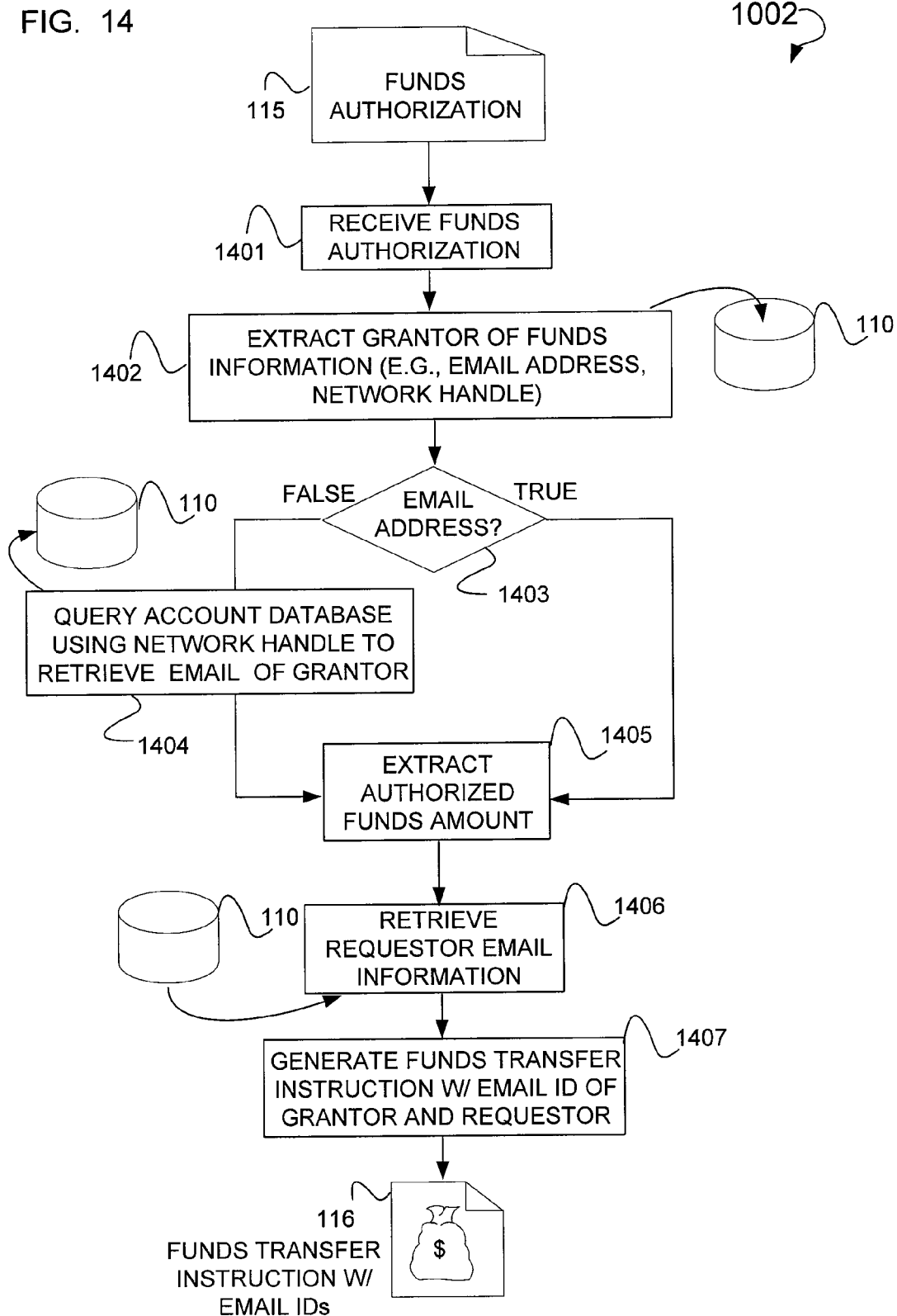
FIG. 14 is a flowchart illustrating a method used to execute the social networking application, according to an example embodiment.

FIG. 14 is a flowchart illustrating an example method used to execute social networking application 1002. Shown is the funds authorization data packet 115 that is received through the execution of an operation 1401. An operation 1402 may be executed to extract the grantor of funds information, such as for example, an email address or a network handle from, for example, an account database 110. A decisional operation 1403 is executed that determines whether the grantor of funds may be contacted via email. In cases where a decisional operation 1403 evaluates to "false," a further operation 1404 is executed that queries the account database 110 to retrieve the email address of the grantor based upon their network handle. In cases where a decisional operation 1403 evaluates to "true," a further operation 1405 is executed that extracts an authorized funds amount. An operation 1406 may be executed to retrieve requests for email information from the account database 110. Then, an operation 1407 may be executed that generates the funds transfer instruction with email IDs 116 for the requestor of funds 101 and the grantor of finds 114. The funds transfer instruction with email IDs 116 is then sent to, for example, the payment processor application 1004.

Figure 15:
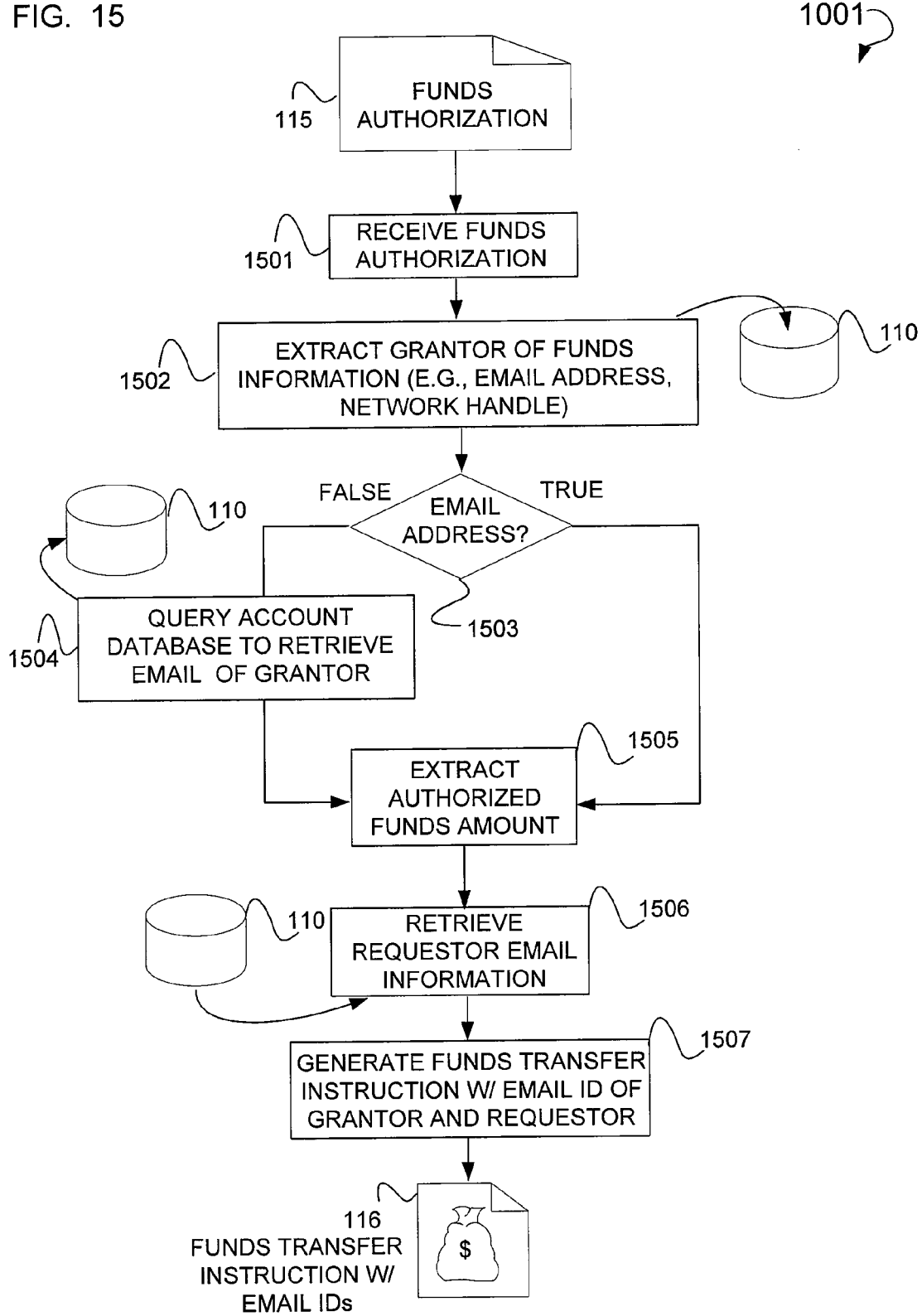
FIG. 15 is a flowchart illustrating a method used to execute the request money application for the purpose of creating a funds transfer instruction with email IDs, according to an example embodiment.

FIG. 15 is a flowchart illustrating an example method used to execute the request money application 1001, where the money request application requests the transfer of funds from the payment processor application 1004. Shown is funds authorization data packet 115 that is received through the execution of operation 1501. An operation 1502 is executed that extracts grantor of funds information from, for example, an account database 110. This funds information may be, for example, an email address or a network handle of a particular party from whom funds are being requested (e.g., the grantor of funds 114). In certain example cases, a decisional operation 1503 is executed that determines whether the email address of the grantor of funds may be used to contact the grantor of funds 114. In cases where a decisional operation 1503 evaluates to "true," an operation 1505 is executed that extracts an authorized funds amount from the funds authorization data packet 115. In cases where a decisional operation 1503 evaluates to "false," an operation 1504 is executed that queries an account database 110 to retrieve the grantor of funds 114's email address An operation 1506 may be executed that retrieves the requestor of funds 101's email information from account database 110. An operation 1507 may be executed that generates the funds transfer instruction with email IDs 116 of the requestor of funds 101 and the grantor of funds 114. Operation 1507 may send the funds transfer instruction with email IDs 116 to the payment processor application server 117 that executes a payment processor application 1004.

Figure 16:
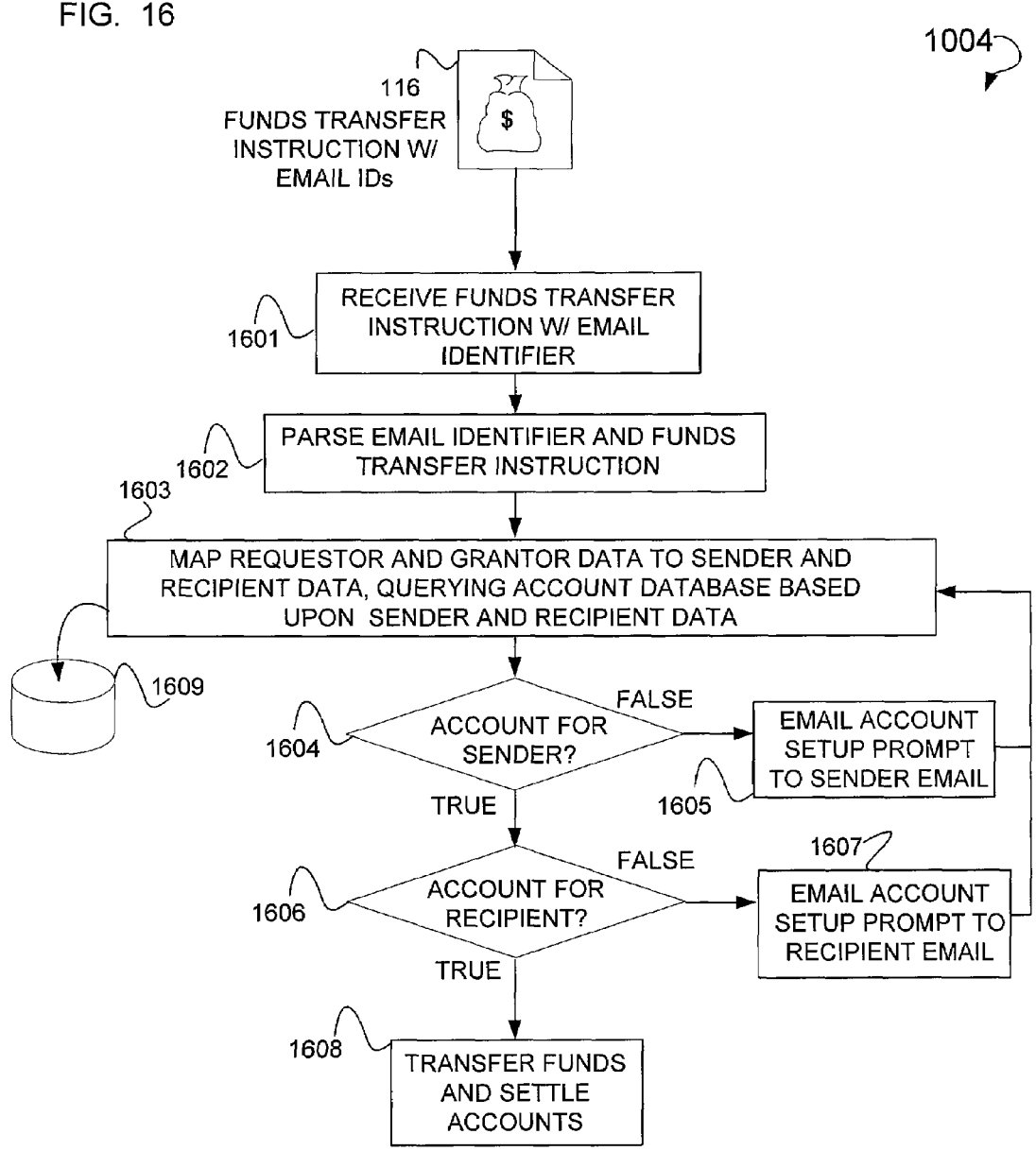
FIG. 16 is a flowchart illustrating a method used to execute the payment processor application, according to an example embodiment.

FIG. 16 is a flowchart illustrating an example method used to execute the payment processor application 1004. Shown is a fund the transfer instructions with email IDs 116 that is received through the execution of an operation 1601. An operation 1602 may be executed that parses an email identifier for the requester of funds 101, an email identifier for the grantor of funds 114, and funds transfer instructions from the funds transfer instructions with email IDs 116. In some example embodiments, the funds transfer instruction with email IDs 116 (e.g., the funds transfer instruction) may be an instruction written using an XML formatted file, or other suitably formatted file, that contains fields describing an account from which funds are to be transferred, and an account to receive funds. Further, a value describing the amount of funds to be transferred may also be disclosed. An operation 1603 may be executed that may map the email identifier for the grantor of funds 114 to sender data, and that may map the email identifier for the requester of funds 101 to a recipient data. Sender data may be data relating to the person (e.g., a natural or legally defined person such as a corporation) from whose account the funds are to be taken. Recipient data may be data relating to the person (e.g., a natural or legally defined person such as a corporation) into whose account the funds are deposited. In some example embodiments, an accounts database 1609 may be queried for the sender and recipient data. A decisional operation 1604 may be executed that determines whether or not an account exists for the sender (e.g., the requester of funds 101). In cases where a decisional operation 1604 evaluates to "false," an operation 1605 may be executed that may email an account setup prompt to the social networking application 1002 to be forwarded to the grantor of funds 114. In cases where a decisional operation 1604 evaluates to "true," a decisional operation 1606 may be executed that determines whether or not an account with the payment processor application 1004 exists for the recipient of the fund (e.g., the requestor of funds 101). In cases where a decisional operation 1606 evaluates to "false," an operation 1607 is executed wherein an email account setup prompt is sent to the social networking application 1002 to be forwarded to the requestor of funds 101. In cases where a decisional operation 1606 evaluates to "true," a further operation 1608 is executed that transfers the funds from the recipient's account to the sender's account (e.g., from the grantor of funds 114 to the requester of funds 101, and the accounts associated therewith).

EXAMPLE STORAGE

Some example embodiments may include the various databases including relational databases (e.g., account database 110), or in some example cases On-Line Analytical Processing (OLAP) based databases. In the case of relational databases, various tables of data are created and data is inserted into, and/or selected from, these tables using a Structured Query Language (SQL) or some other database-query language known in the art. In the case of OLAP databases, one or more multi-dimensional cubes or hypercubes containing multidimensional data from which data is selected from or inserted into using a Multi-Dimensional Expression (MDX) language may be implemented. In the case of a database using tables and SQL, a database application such as, for example, MYSQL™, SQLSERVER™, Oracle 8I™, 10G™, or some other suitable database application may be used to manage the data. In the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables, or cubes made up of tables in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 17:
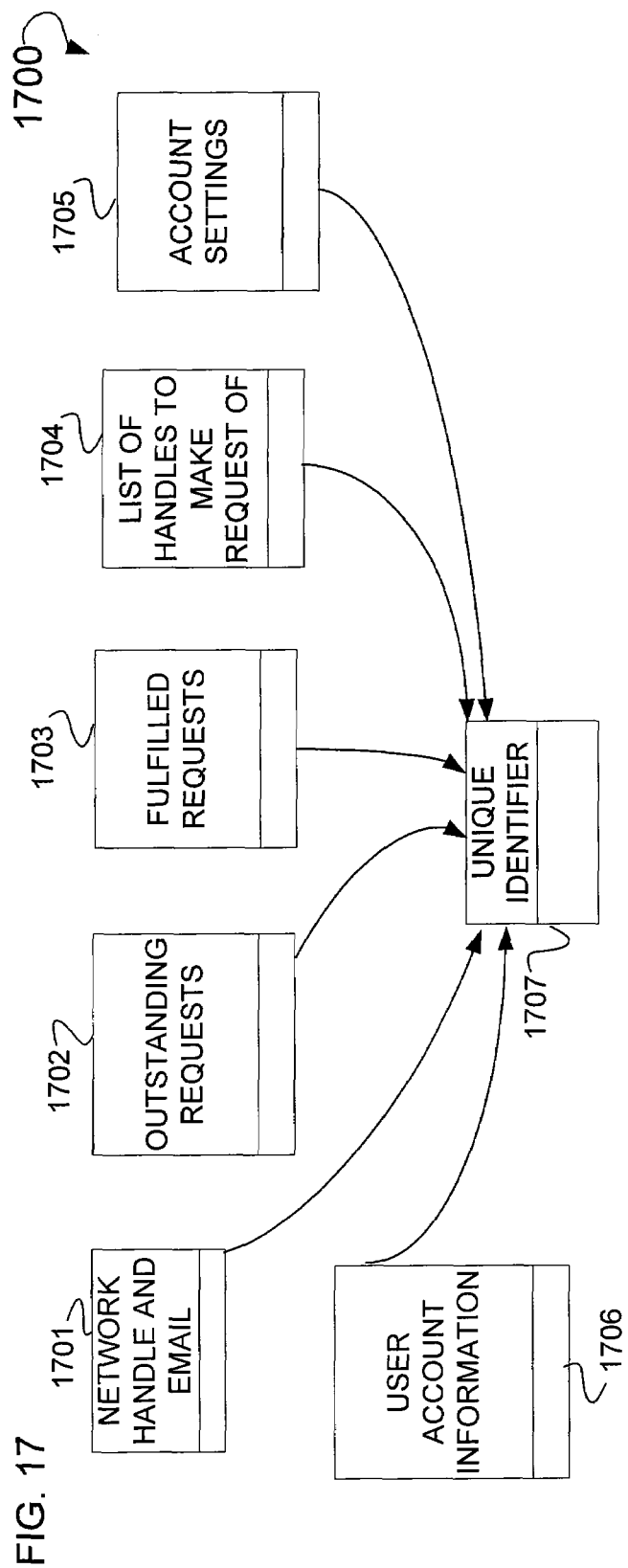
FIG. 17 is a Relational Data Schema (RDS) illustrating various data tables associated with an account database, according to an example embodiment.

FIG. 17 is a RDS 1700 illustrating various data tables associated with, for example, the account database 110. Shown is a table 1701 that contains network handle and email information. This network handle and email information may be information uniquely identifying, for example, the requestor of funds 101, the grantor of funds 114, or some other suitable person with an account that resides as a part of the payment processor application 1004. This network handle and email information may be stored using some suitable data type, including, for example, a string or a float. A table 1702 is also illustrated that contains various outstanding requests. These outstanding requests relate to requests for funds made by the requestor of funds 101. This table 1702 may contain data including the party to whom the request is sent, the amount, what the request is for, the date of the request, and the status of their request. Various data types used in this table 1702 may include, for example, a string or a float to capture the party from whom the request has been made, a string, float, or currency data type for the amount, a string data type relating to what the request is for, a date data type to store information regarding the date the request is made, and a string data type for the status information.

In some example embodiments, a table 1703 is shown containing information or data relating to field requests. Contained within this table 1703 may be information relating to who has responded to the request for funds (e.g., the grantor of funds 114), an amount with the purpose for what the provided money is, an update that the funds were provided, and the status of the providing of the funds. Various data types may be used in this table 1703 including, for example, a string data type to denote who the requested funds have been received from; a currency, integer, or float data type used to denote the amount of the funds; a string data type for the fields denoting the purpose of the funds; a date data type for the date the funds were received; and a string data type for the status of the funds once received. Further, illustrated is a table 1704 that contains a list of network handles from whom requests for funds may be made, or to whom requests for funds may be directed. Contained in this table 1704 is any one of a number of network handles that may uniquely identify a particular individual that may be a part of the social networking site, or who more specifically may have an account residing on the social networking application server 109. A string integer or some other suitable data type may be used to store these network handles. Further, a table 1705 is shown containing various accounts settings. These account settings may relate to particular pre-defined settings for a particular user's social networking homepage. One or more Boolean data types may be used to stores these settings. A further table 1706 is shown containing user account information. This table 1706 may contain user account information which may be in the form of, for example, contact information allowing one to contact a particular party having an account on the social networking application server 109. This user account information may be, for example, a particular person (e.g., the requestor of funds 101, the grantor of funds 114), their physical address, their telephone number, their email address, and other suitable information. String data types may be used to store this information. The table 1707 is used to contain unique identifier information to uniquely identify each of the pieces of data contained in each of the tables 1701 through 1706. This unique identifier information may be some type of unique integer value serving as, for example, a foreign key in each of the tables 1701 through 1706.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer systems as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may utilize the OSI basic reference model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some example cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

FIG. 18 shows a diagrammatic representation of a machine in the example form of a computer system 1800 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 1800 includes a processor 1802 (e.g., a Central Processing Unit (CPU), a Graphics Processing Unit (GPU) or both), a main memory 1801 and a static memory 1806, which communicate with each other via a bus 1808. The computer system 1800 may further include a video display unit 1810 (e.g., a Liquid Crystal Display (LCD) or a Cathode Ray Tube (CRT)). The computer system 1800 also includes an alphanumeric input device 1817 (e.g., a keyboard), a User Interface (UI) cursor controller 1811 (e.g., a mouse), a disc drive unit 1816, a signal generation device 1818 (e.g., a speaker) and a network interface device (e.g., a transmitter) 1820.

The disc drive unit 1816 includes a machine-readable medium 1822 on which is stored one or more sets of instructions 1821 and data structures (e.g., software) embodying or utilized by any one or more of the methodologies or functions illustrated herein. The software may also reside, completely or at least partially, within the main memory 1801 and/or within the processor 1802 during execution thereof by the computer system 1800, the main memory 1801 and the processor 1802 also constituting machine-readable media.

The instructions 1821 may further be transmitted or received over a network 1826 via the network interface device 1820 utilizing any one of a number of well-known transfer protocols (e.g., Hyper Text Transfer Protocol (HTTP), Session Initiation Protocol (SIP)).

In some example embodiments, a removable physical storage medium is shown to be a single medium, and the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any of the one or more methodologies illustrated herein. The term "machine-readable medium"

shall accordingly be taken to include, but not be limited to, solid-state memories, optical and magnetic medium, and carrier wave signals.

Marketplace Applications

In some example embodiments, a system and method is illustrated that allows users of social networking sites to utilize a downloadable widget in the form of a money request application to make funds requests of other users of the social networking site. Some example embodiments may include users of a social networking site generating a funds request while still maintaining the anonymity provided by the use of network handles in lieu of actual email addresses. Further, grantors of funds may similarly maintain their anonymity in the granting of the requested funds. For example, a user of the social networking site generating a funds request for their favorite charity can be done without having to divulge their identity through the use of, for example, an email address. Moreover, this anonymity is further preserved through the use of a payment processor to facilitate the actual transfer of funds between the requestor of funds and the grantor of funds. Specifically, while the payment processor may know the email address of the requester of funds and the grantor of funds, the requestors and grantors may not know this information.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   receiving a funds request that contains an identifier to uniquely identify a first member of a first social networking community, at least one identifier to uniquely identify a second member from which funds are requested, and an amount of funds requested, the funds request being generated based on information including the amount of funds requested and the identifier of the second member that is received via a payment user interface of a social networking page of the first member provided by the first social networking community;
   receiving a funds authorization from the second member of a second social networking community, the funds authorization being generated based on information received via a social networking page of the second member provided by the second social networking community;
   transmitting, using one or more processors, a funds transfer instruction based upon the funds authorization; and
   transferring the amount of funds requested from an account held by the second member of the second social networking community to an account held by the first member of the first social networking community.

2. The computer implemented method of claim 1, wherein the identifier comprises a network handle, the method further comprising mapping the network handle to an email address.

3. The computer implemented method of claim 1, wherein the funds transfer instruction includes an email identifier.

4. The computer implemented method of claim 1, further comprising transmitting the funds transfer instruction, based upon the funds authorization, to a payment processor.

5. The computer implemented method of claim 4, further comprising determining whether the first member of the first social networking community has an account with the payment processor.

6. The computer implemented method of claim 4, further comprising determining whether the second member of the second social networking community has an account with the payment processor.

7. The computer implemented method of claim 4, further comprising prompting a user to set up an account with the payment processor, the user including at least one of the second member of the second social networking community, or the first member of the first social networking community.

8. The computer implemented method of claim 1, wherein the first member and the second member are members of the same social networking community.

9. A computer system comprising:
   a first receiver to receive input selecting a network handle generated by a selection device, the network handle being used in lieu of an e-mail address, the input including the network handle and a payment amount being received via a payment user interface of a social networking page of the user, the user being a member of a social networking community providing the social networking page;
   a first update engine to update a data store to track a funds request involving the selected network handle;
   a first transmitter to transmit the funds request and the network handle; and
   a first display to display the funds request on the social networking page of the user using a Graphical User Interface (GUI).

10. The computer system of claim 9, further comprising:
    a second receiver to receive a funds payment confirmation;
    a second update engine to update a data store to track a payment made in response to the funds request; and
    a second display to display the payment made in the GUI.

11. The computer system of claim 9, further comprising a second receiver to receive the funds request that identifies a first member of a first social networking community.

12. The computer system of claim 9, further comprising:
    a second receiver to receive input that selects the funds request as displayed in a second GUI; and
    a first generator to generate a funds authorization that identifies a second member of a second social networking community; and
    a second transmitter to transmit a funds authorization message.

13. The computer system of claim 12, wherein the second GUI is displayed as part of an instant messaging application.

14. The computer system of claim 12, further comprising a second generator to generate a funds transfer instruction based, in part, upon the funds authorization message.

15. The computer system of claim 14, further comprising a third transmitter to transmit the funds transfer instruction, based upon the funds authorization message, to a payment processor.

16. The computer system of claim 15, further comprising a determination engine to determine whether a first member of the first social networking community has an account with the payment processor based, in part, upon the funds authorization message.

17. The computer system of claim 15, further comprising a determination engine to determine whether the second member of the second social networking community has an account with the payment processor, based, in part, upon the funds authorization message.

18. The computer system of claim 15, further comprising a prompt engine to prompt a user to set up an account with the payment processor, based, in part, upon the funds authorization message, the user including at least one of the second member of the second social networking community and a first member of the first social networking community.

19. The computer system of claim 12, further comprising a third transmitter to transmit a funds transfer instruction based upon the funds authorization message, using at least one of a social networking application and a widget application.

20. In a computer system having a Graphical User Interface (GUI) including a display and a selection device, a method of providing and selecting from a menu on the display, the method comprising:
retrieving a set of network handles, each member of the set having an existing social networking relationship with a user of a social networking application, the set of network handles being used in lieu of e-mail addresses;
displaying the set of network handles in the display of a social networking page of the user provided by a social networking site associated with the social networking application;
receiving a first selection signal indicating a selection of a network handle, from the set of network handles, to which a funds request will be sent; and
generating the funds request using the selected network handle and an indicated payment amount received via a payment user interface of the social networking page.

21. In the computer system having the GUI including the display and the selection device of claim 20, the method further comprising:
retrieving a set of funds requests, each member of the set identifying a first member of a first social networking community and an amount of funds requested;
displaying the set of funds requests as part of the GUI;
receiving a second selection signal indicating a selection of a member of the set of funds requests; and
displaying the member of the set of funds requests as selected.

22. In the computer system having the GUI including the display and the selection device of claim 20, the method further comprising:
retrieving a set of granted funds requests, each member of the set identifying a funds requests that has been granted; and
displaying the members of the set of granted funds requests in the GUI.

23. An apparatus comprising:
means for receiving a funds request that contains an identifier to uniquely identify a first member of a social networking community, an identifier of at least one second member from which funds are requested, and an amount of funds requested, the funds request being generated based on information including the amount of funds requested and the identifier of the second member that is received via a payment user interface of a social networking page of the first member provided by the social networking community;
means for receiving a funds authorization from the second member of the social networking community, the funds authorization being generated based on information received via a social networking page of the second member provided by the social networking community;
means for transmitting a funds transfer instruction based upon the funds authorization; and
means for transferring the amount of funds requested from an account held by the second member of the second social networking community to an account held by the first member of the first social networking community.

24. A machine-readable hardware device comprising machine-executable instructions, which when implemented by one or more processors of a machine, cause the machine to perform operations comprising:
receiving a funds request that contains an identifier to uniquely identify a first member of the first social networking community, an identifier of at least one second member from which funds are requested, and an amount of funds requested, the funds request being generated based on information including the amount of funds requested and the identifier of the second member that is received via a payment user interface of a social networking page of the first member provided by the first social networking community;
receiving a funds authorization from the second member of a second social networking community, the funds authorization being generated based on information received via a social networking page of the second member provided by the second social networking community; transmitting a funds transfer instruction based upon the funds authorization; and transferring the amount of funds requested from an account held by the second member of the second social networking community to an account held by the first member of the first social networking community.

\* \* \* \* \*